United States Patent [19]

Miller

[11] 4,084,253

[45] Apr. 11, 1978

[54] CURRENT MODE ARITHMETIC LOGIC CIRCUIT WITH PARITY PREDICTION AND CHECKING

[75] Inventor: Homer Warner Miller, Peoria, Ariz.

[73] Assignee: Honeywell Information Systems Inc., Phoenix, Ariz.

[21] Appl. No.: 756,457

[22] Filed: Jan. 3, 1977

[51] Int. Cl.² .......................................... G06F 11/10
[52] U.S. Cl. .................................................. 364/738
[58] Field of Search .................. 235/153 BB; 364/738

[56] References Cited

U.S. PATENT DOCUMENTS

| 3,649,817 | 3/1972 | Keller et al. | 364/738 |
| 3,758,760 | 9/1973 | Cowan | 364/738 |
| 3,925,647 | 12/1975 | Louie | 364/738 |
| 3,986,015 | 10/1976 | Gooding et al. | 364/738 |

OTHER PUBLICATIONS

Hsiao and Wolff, High-Speed, Self-Checked, BCD Adder, IBM Technical Disclosure Bulletin, vol. 4, No. 12, May 1962, pp. 59-61.

*Primary Examiner*—Charles E. Atkinson
*Attorney, Agent, or Firm*—William W. Holloway, Jr.; Ronald T. Reiling; Nicholas Prasinos

[57] ABSTRACT

A current mode arithmetic logic circuit utilizes a unique combination of a 4-bit and a 5-bit arithmetic logic unit for performing parity prediction and parity checking on an $n$-bit byte plus parity, in addition to performing 16 binary or 16 Boolean operations on two $n$-bit plus parity bytes.

2 Claims, 3 Drawing Figures

CURRENT MODE ARITHMETIC LOGIC CIRCUIT WITH PARITY PREDICTION AND CHECKING

CROSS-REFERENCE TO RELATED INVENTIONS

1. Current Mode Carry Look Ahead Array invented by Homer W. Miller, now issued as U.S. Pat. No. 3,925,652 and assigned to the same assignee as the instant invention.

2. Magnitude Comparison Circuit invented by Homer W. Miller, now issued as U.S. Pat. No. 3,955,177 and assigned to the same assignee as the instant invention.

3. Current Mode Arithmetic Logic Array invented by Homer W. Miller, now issued as U.S. Pat. No. 3,925,651 and assigned to the same assignee as the instant invention.

4. Current Mode Binary (BCD) Arithmetic Array invented by Homer W. Miller, now issued as U.S. Pat No. 3,958,112 and assigned to the same assignee as the instant invention.

5. Data Alignment Circuit invented by Darrell L. Fett, now issued as U.S. Pat. No. 3,967,101 and assigned to the same assignee as the instant invention.

6. Selector Latch Gate invented by Darrell L. Fett, now issued as U.S. Pat. No. 3,953,746 and assigned to the same assignee as the instant invention.

7. N-bit Register System Using CML Circuits invented by Darrell L. Fett, now issued as U.S. Pat. No. 3,984,702 and assigned to the same assignee as the instant invention.

8. High-Speed Random Access Memory invented by Darrell L. Fett, now issued as U.S. Pat. No. 3,916,394 and assigned to the same assignee as the instant invention.

9. Multiple-Generating Register invented by Darrell L. Fett, now issued as U.S. Pat. No. 3,949,209 and assigned to the same assignee as the instant invention.

10. Multiple-Generating Register invented by Jerome L. Kindell, bearing Ser. No. 642,845, filed Dec. 22, 1975 now U.S. Pat. No. 4,034,198, and assigned to the same assignee as the instant invention.

11. Current Mode 5-Bit Arithmetic Logic Unit With Parity invented by Homer W. Miller bearing Ser. No. 756,456, filed Jan. 3, 1977, and assigned to the same assignee as the instant invention.

12. Current Mode Multiple-Generating Register invented by Homer W. Miller bearing Ser. No. 756,465, filed Jan. 3, 1977, and assigned to the same assignee as the instant invention.

13. Current Mode Simultaneous Dual-Read/Single-Write Memory Device invented by Darrell L. Fett bearing Ser. No. 756,466, filed Jan. 3, 1977, and assigned to the same assignee as the instant invention.

14. Current Mode 4-Bit Arithmetic Logic Unit With Parity invented by Homer W. Miller bearing Ser. No. 756,458, filed Jan. 3, 1977, and assigned to the same assignee as the instant invention.

15. Current Mode Binary/Decimal Arithmetic Logic Unit With Parity invented by Homer W. Miller bearing Ser. No. 756,460, filed Jan. 3, 1977, and assigned to the same assignee as the instant invention.

16. 5-Bit 1-of-4 Gated Select Circuit Utilizing Current Mode Logic invented by Homer W. Miller bearing Ser. No. 756,464, filed Jan. 3, 1977, and assigned to the same assignee as the instant invention.

17. 17-Bit Equality Comparator Utilizing Current Mode Logic invented by Homer W. Miller bearing Ser. No. 756,459, filed Jan. 3, 1977, and assigned to the same assignee as the instant invention.

18. J-K Flip-Flop Utilizing Current Mode Logic With Non-Functional Test Capability invented by Homer W. Miller bearing Ser. No. 756,461, filed Jan. 3, 1977, and assigned to the same assignee as the instant invention.

19. 4-Bit Counter/Shift Register Utilizing Current Mode Logic invented by Homer W. Miller bearing Ser. No. 756,463, filed Jan. 3, 1977, and assigned to the same assignee as the instant invention.

20 10-Bit D-Type Register Utilizing Current Mode Logic invented by Homer W. Miller bearing Ser. No. 756,462, filed Jan. 3, 1977, and assigned to the same assignee as the instant invention.

BACKGROUND OF THE INVENTION

This invention relates generally to digital logic circuitry and, more particularly, to a current mode arithmetic logic circuit with parity prediction and checking.

Various arithmetic logic units are known in the prior art. A 4-bit arithmetic logic unit with parity and a 5-bit arithmetic logic unit with parity are disclosed in the above-identified Ser. Nos. 756,456 and 756,458. The 4-bit arithmetic logic unit with parity disclosed in Ser. No. 756,458 is capable of performing parity prediction, parity checking, and carry checking operations on a 4-bit plus parity byte. The current mode arithmetic logic circuit with parity prediction and checking of the present invention provides, in addition to 16 basic arithmetic and 16 logic functions, necessary and useful parity prediction, parity checking, and carry checking operations on an $n$-bit plus parity byte. The particular form of implementation of the present invention depends upon the byte length $n$. The present invention has significant value in the early detection of errors generated within the arithmetic logic circuit or generated during the transmission of the binary data to such circuit, resulting in an overall savings of processing time. In addition, the present invention offers greater flexibility regarding the byte length of the binary data which may be operated on than the 4-bit arithmetic logic unit disclosed in Ser. No. 756,458 mentioned above.

OBJECTS OF THE INVENTION

It is therefore an object of the present invention to provide an improved current mode arithmetic logic circuit.

It is also an object of the present invention to provide an improved current mode arithmetic logic circuit which performs parity prediction on an $n$-bit plus parity byte of binary data.

It is yet another object of the present invention to provide an improved current mode arithmetic logic circuit which performs parity checking operations on an $n$-bit byte of binary data.

It is a further object of the present invention to provide an improved current mode arithmetic logic circuit which performs carry checking operations on an $n$-bit byte of binary data.

These and other objects of the invention are achieved in accordance with a preferred embodiment of the invention by coupling an improved current mode 4-bit arithmetic logic unit with parity and an improved current mode 5-bit arithmetic logic unit with parity in one of several ways, depending upon the number of bits $n$ in the data byte. Where $1 < n < 4$, the improved current mode 4-bit arithmetic logic unit with parity disclosed in the above-identified Ser. No. 756,458 is capable of handling this byte length independently without the assistance of the 5-bit arithmetic logic unit disclosed in Ser. No. 756,465. In the case where $n=5$, the 5-bit arithmetic logic unit is utilized to perform the basic arithmetic and logic functions, and the 4-bit arithmetic logic unit is utilized to perform the parity prediction, parity checking, and carry checking operations.

In the case where $6 < n \leq 9$, the 5 least significant bits in the byte are input into the 5-bit arithmetic logic unit, and the remaining $n-5$ bits are input into the most significant bit positions in the 4-bit arithmetic logic unit. Where it is desired to perform a parity prediction or parity checking operation on a single parity bit for an $n$-bit byte where $n > 9$, additional logic circuitry is provided to the combination of the 4-bit and 5-bit arithmetic logic units.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
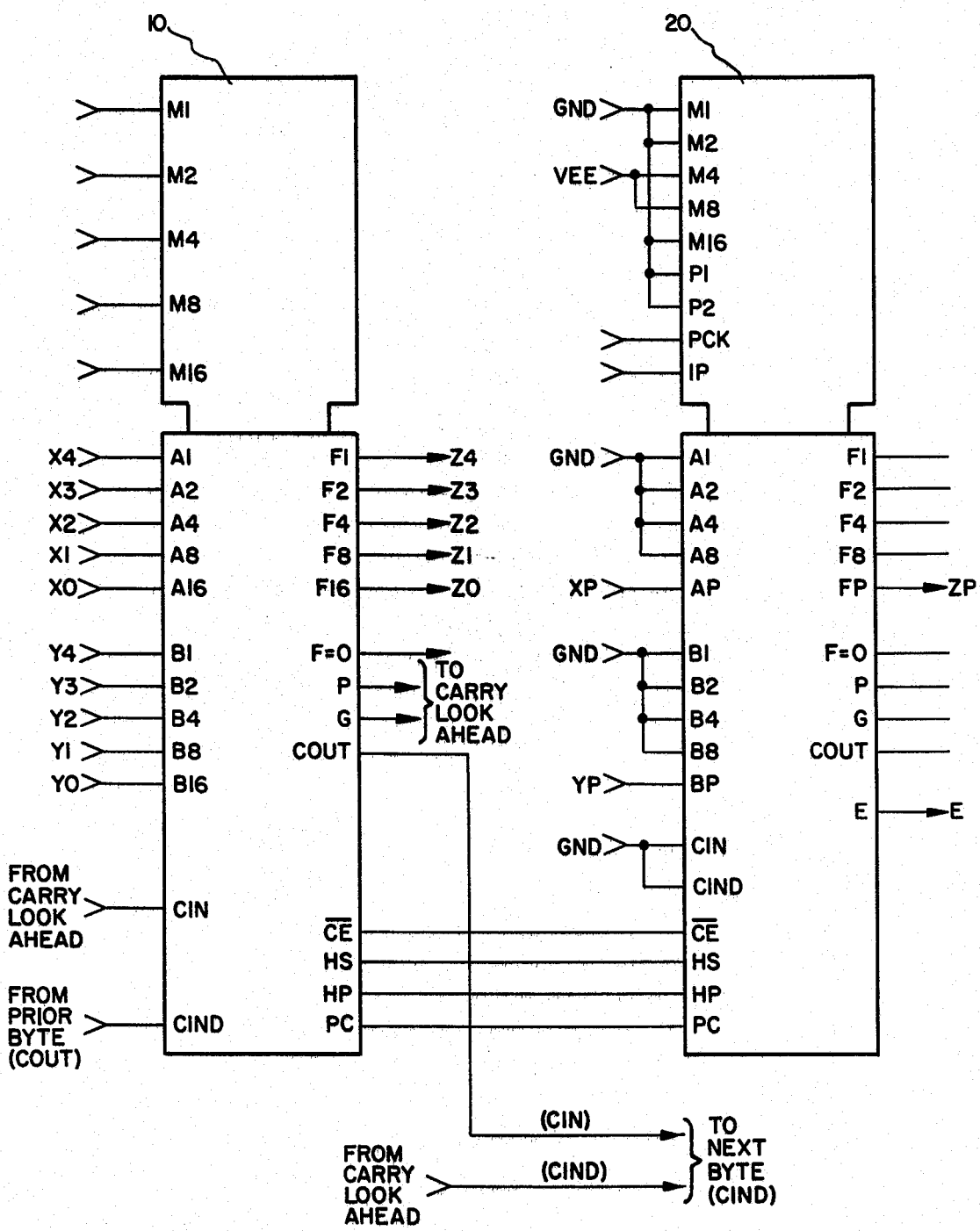
FIG. 1 shows a block diagram illustrating one embodiment of the current mode arithmetic logic circuit with parity prediction and checking of the present invention.

With reference now to FIG. 1, a block diagram is shown illustrating one embodiment of the current mode arithmetic logic circuit with parity prediction and checking. The embodiment shown in FIG. 1 is used to perform parity prediction, parity checking, and carry checking for arithmetic and logic operations performed on two $n=5$ bit bytes. One 5-bit byte is represented by bits X0-X4 (X0 is the most significant bit) which are input into input terminals A16-A1 of 5-bit arithmetic logic circuit 10. The other 5-bit byte is represented by Y0-Y4 which are received at input terminals B16-B1 of unit 10.

The 5-bit arithmetic logic unit 10 is used in conjunction with a 4-bit arithmetic logic unit 20 to perform the desired arithmetic and logic functions, and most importantly in terms of the objects of the present invention, to perform the parity prediction, parity checking, and carry checking operations. According to the configuration shown in FIG. 1, 5-bit arithmetic logic unit 10 performs the required arithmetic and logic functions, and 4-bit arithmetic logic unit serves primarily to perform the required parity prediction, parity checking, and carry checking operations. In this configuration, the A1-A8 and B1-B8 inputs of 4-bit arithmetic logic unit 20 are connected to ground. The AP input terminal of unit 20 receives the parity bit associated with the set of Xi bits, and the BP terminal receives the parity bit YP associated with the set of Yi input bits. The carry-in CIN input terminal of unit 20 and the duplicate carry-in CIND terminal are also connected to ground.

The 5-bit arithmetic logic unit 10 receives as inputs thereto a 5-bit mode control signal M1-M16 at its terminals M1-M16. The 4-bit arithmetic logic unit has its M1, M2, M16, P1, and P2 input terminals connected to ground, and its M4 and M8 control input terminals are connected to VEE (logical 1). The 4-bit arithmetic logic unit 20 receives additional control signals in the form of parity check PCK and invert parity IP at its PCK and IP input terminals, respectively. Unit 20 receives as inputs to its $\overline{CE}$, HS, HP, and PC input terminals corresponding signals generated by 5-bit arithmetic logic unit 10. The 4-bit arithmetic logic unit 20 generates as output signals the parity prediction bit ZP from its FP output terminal, and error signal E from output terminal E.

The 5-bit arithmetic logic unit 10 generates a 5-bit binary output signal Z0-Z4 from terminals F16-F1, respectively, representing the result of the particular arithmetic or logic operation prescribed by the 5-bit command signal M1-M16 applied to the control inputs of unit 10. Unit 10 generates F=0, P, G, and COUT signals at its corresponding output terminals. Unit 10 also generates output signals $\overline{CE}$, HS, HP, and PC. Logic unit 10 receives a CIN signal from the carry look-ahead logic unit and a CIND signal from the prior byte if such is present.

The operation of the embodiment of the current mode arithmetic logic circuit with parity prediction and checking illustrated in FIG. 1 as well as those embodiments illustrated in FIGS. 1-3 may be illustrated with the use of the logic equations set forth in the following section of the detailed description.

PARITY PREDICTION AND PARITY CHECKING

The generalized equation for the output Fi in an arithmetic operation is:

$$Fi = HSi \oplus Ci \qquad \text{Eq. 1}$$

where $Fi$ is the output bit, $HSi$ is the corresponding half-sum and $Ci$ is the carry into bit position $i$.

To form the predicted parity bit of an $n$-bit resultant, $$FP = 1 \oplus \sum_{i=0}^{n-1} Fi \qquad \text{Eq. 2}$$

$$FP = 1 \oplus [\sum_{i=0}^{n-1} HSi \oplus \sum_{i=0}^{n-1} Ci]$$

Unless noted otherwise the parities mentioned refer to odd parities, i.e., the number of one bits in the data field plus the parity bit must be odd.

In this notation scheme, bit 0 denotes the least significant bit and bit $(n-1)$ the most significant bit.

The summations used in Equation 2 are simply additions modulo 2, i.e., $$\sum_{i=1}^{n} xi = x1 \oplus x2 \oplus x3 \oplus \ldots \oplus xn \qquad \text{Eq. 3}$$

Failures in the carry circuitry can impact only one carry bit Ci at most, producing a single-bit error which will always be detected by a parity check.

However, consider the formation of the carries:

$$C_{i+1} = f(G_i, HS_i, G_{i-1}, HS_{i-1}, \ldots CIN) \quad \text{Eq. 4}$$

In other words, the carries are functions of all previous generate (Gi) and half-sum (HSi) terms within a set of connected identical circuits.

It should be apparent an error in Gi or HSi could cause errors in $C_{i+1}$, $C_{i+2}$, ... such that a "burst" error results.

Special care must be taken against burst errors, since even length bursts may go undetected.

As a result, there is an internal "half-sum check" to insure the half-sum terms were formed correctly. By the nature of the implementation, this check also provides coverage against generate failures.

In addition to the input cell which produces the HS and G terms, there is a similar structure which produces a "half-parity" term. This HP signal is defined such that:

$$HS_i + HP_i = A_i + B_i \quad \text{Eq. 5}$$

For an *n*-bit application, $$\sum_{i=0}^{n-1} HS_i \oplus \sum_{i=0}^{n-1} HP_i = \sum_{i=0}^{n-1} A_i \oplus \sum_{i=0}^{n-1} B_i \quad \text{Eq. 6}$$

In other words the input odd parities for the A and B operand fields must equal the exclusive-OR of the HS and HP parities. If there is a miscompare, the internal error flag goes to a logical 1.

This check provides coverage against burst errors caused by errors in the input cells. From Equation 4, the only "uncovered" term is CIN, the carry input. Again, an incorrect CIN could produce a burst error. To guard against this condition, a CIN duplicate signal CIND is required. The carry inputs are compared (CIN + CIND), and the internal flag is raised if a miscompare is noted.

Since this compare occurs late in the checking process, the CIN term should originate from the carry-look-ahead circuit, and CIND should be the COUT (Carry Output) term from the previous identical 4-bit ALU.

This checking scheme therefore protects against errors in the carry-look-ahead structure.

In summary, by performing the half-sum check (Equation 6) and the carry input compare, coverage against burst errors is provided.

Returning to the predicted output parity, refer again to Equation 1. It can be shown that errors in Ci will always impact the output bit Fi making the parity check useless if the parity of the carries, PC, is generated from the carries themselves. Referring to Equation 4 again, the parity of the carries can be generated from the HS and G terms. In this manner, errors can be "double-checked" since these terms are checked by the internal error flag.

Therefore, Equation 2 can be restated as:

$$FP = \sum_{i=0}^{n-1} HS_i \oplus PC \oplus 1 \quad \text{Eq. 7}$$

Where PC is the parity of the carries expressed as a function of the generate and half-sum terms.

With specific regard to the 5-bit arithmetic logic unit, the parity of the half-sum and parity of the half-parity terms are given as follows:

$$HS(5\text{-bit}) = HS1 \oplus HS2 \oplus HS4 \oplus HS8 \oplus HS16$$

$$HP(5\text{-bit}) = HP1 \oplus HP2 \oplus HP4 \oplus HP8 \oplus HP16$$

The carry parity is separated into two signals: the parity due to a carry input (PCin) and the parity due to internally generated carries (PCi).

$$PCin(5\text{-bit}) = CIN.\overline{HS1}.\overline{HS2.HS4}.\overline{HS2.HS8}$$
$$PCi(5\text{-bit}) = G1.(\overline{HS2} + \overline{HS4.HS8}) \oplus G2.\overline{HS4.HS8} \oplus G4.\overline{HS8} \oplus G8$$

The total carry parity (PC) is defined as:

$$PC(5\text{-bit}) = M16.(PCin \oplus PCi)$$

Additionally, the carry input comparison is defined as:

$$\overline{\text{Carry Error (5-bit)}} = CIN \oplus CIND \oplus M16$$

Therefore, there are a total of four parity output signals from the 5-bit arithmetic logic unit:
HS(5-bit) Parity of the half-sum terms
HP(5-bit) Parity of the half-parity terms
PC(5-bit) Parity of the carry terms
Carry Error (5-bit) Comparison of the carry input signals Regarding the 4-bit arithmetic logic unit, the parity of the half-sum and parity of the half-parity terms may be expressed as follows:

$$HS(4\text{-bit}) = HS1 \oplus HS2.K2 \oplus HS4.K4 \oplus HS8.K8$$

$$HP(4\text{-bit}) = HP1 \oplus HP2.K2 \oplus HP4.K4 \oplus HP8.K8$$

Again, the carry parity is broken into two signals:

$$PCin(4\text{-bit}) = M16.CIN.\overline{HS1}.\overline{K2.HS2}.\overline{K4.HS4.K8}$$
$$PCi(4\text{-bit}) = M16(G1.K2.\overline{HS2.K4.HS4.K8} \oplus G2.K4.\overline{HS4.K8} \oplus G4.K8)$$
$$PC(4\text{-bit}) = PCin \oplus PCi$$
$$\overline{\text{Carry Error (4-bit)}} = CIN \oplus CIND \oplus 1$$

The predicted parity bit FP is formed following the equation:

$$FP = HS(5\text{-bit}) \oplus HS(4\text{-bit}) \oplus PC(5\text{-bit}) \oplus PC(4\text{-bit}) \oplus IP \oplus M16$$

where IP is a control line such that if IP=0, FP represents the odd output parity, or if IP=1, the even output parity is generated.

The internal error signal E is generated as:

$$E = \overline{C\text{ Errors}(5\text{-bit}).\overline{C\text{ Error }(4\text{-bit})}.\overline{HS\text{ Error}}}$$

where the half-sum error ($\overline{HS\text{ Error}}$) is defined:
$$\overline{HS\text{ Error}} = HS(5\text{-bit}) \oplus HS(4\text{-bit}) \oplus HP\,(5\text{-bit}) \oplus HP\,(4\text{-bit}) \oplus AP \oplus BP \oplus M16$$

Figure 2:
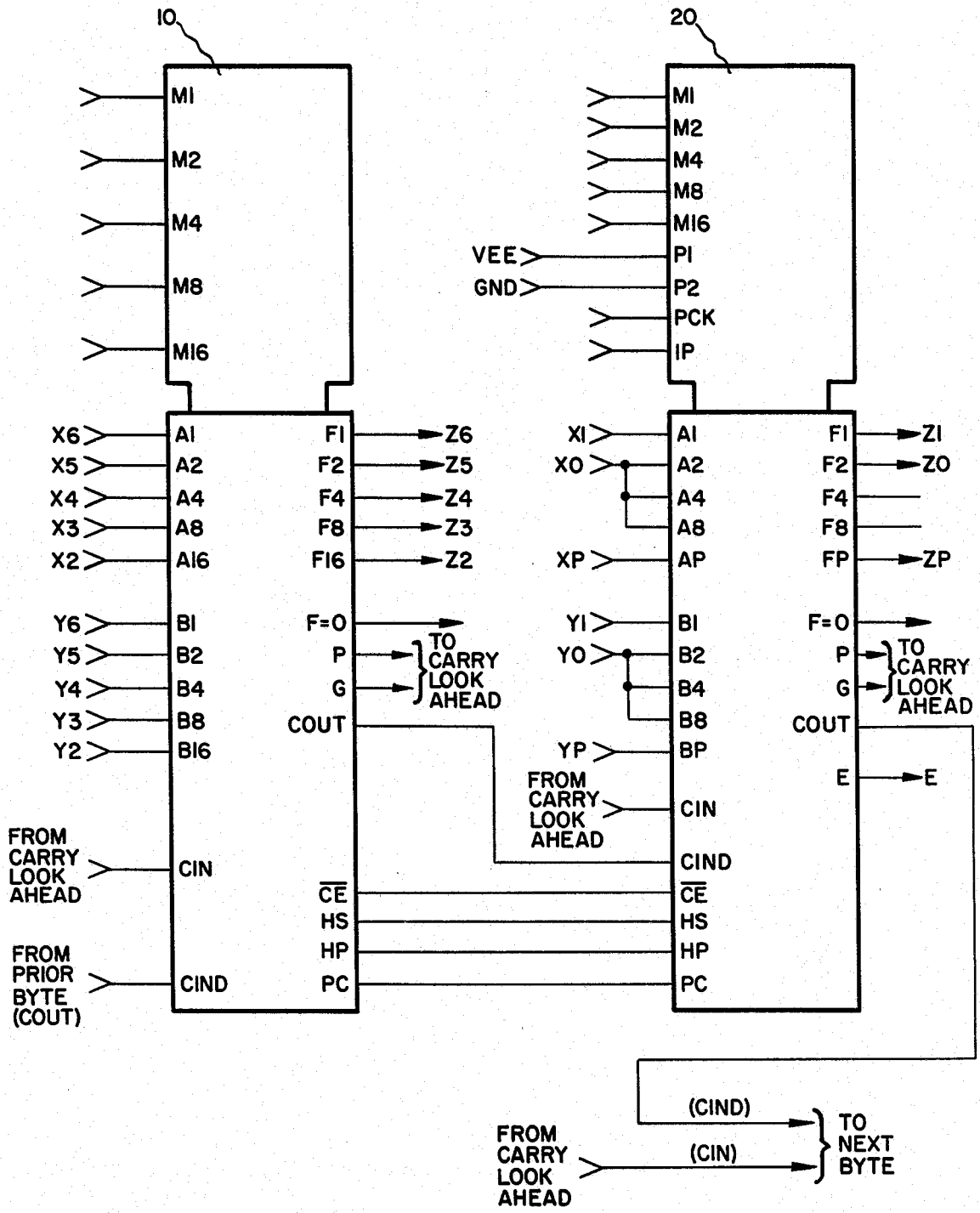
FIG. 2 shows a block diagram illustrating another embodiment of the current mode arithmetic logic circuit with parity prediction and checking of the present invention.

In the configuration shown in FIG. 1, the A1-A8 and B1-B8 inputs of 4-bit arithmetic logic unit 20 are all set to logical 0's. This forces all of the HS (4-bit), HP (4-bit), and PC (4-bit) terms to logical 0 also, reducing the parity equations above to the form:

$$FP = HS(5\text{-bit}) \oplus PC(5\text{-bit}) \oplus IP \oplus 1$$

$$E = \overline{\overline{C\text{ Error}(5\text{-bit})}.\overline{HS\text{ Error}}}$$

where $\overline{HS\text{ Error}} = AP \oplus BP \oplus HS(5\text{-bit}) \oplus HP\,(5\text{-bit}) \oplus M16$ With reference now to FIG. 2, a block diagram is shown illustrating another embodiment of the current mode arithmetic logic circuit with parity prediction and checking of the present invention. The configuration shown in FIG. 2 illustrates the manner in which the 5-bit arithmetic logic unit 10 and the 4-bit arithmetic logic unit 20 may be combined to accommodate a byte of length $n$, where $5 < n \leq 9$. The specific configuration shown in FIG. 2 illustrates the required interconnections between logic units 10 and 20 for the case where $n = 7$.

As shown in FIG. 2, the most significant bits X0 and X1 of byte X$i$ are input into the A2 and A1 inputs, respectively, of 4-bit arithmetic logic unit 20. The unused inputs A4 and A8 are connected to the A2 input in order that the correct operation of the device be achieved. The least significant bits X2-X6 are received at the A16-A1 input terminals of the 5-bit arithmetic logic unit 10. Correspondingly, the most significant bits Y0 and Y1 of byte Y$i$ are received at the B2 and B1 input terminals, respectively, of 4-bit arithmetic logic unit 20, and the least significant bits Y2-Y6 are received at the B16-B1 input terminals of 5-bit arithmetic logic unit 10. The parity bit XP associated with the X$i$ byte and the parity bit YP associated with the Y$i$ byte are received at input terminals AP and BP, respectively, of 4-bit arithmetic logic unit 20.

The most significant bits Z0 and Z1 of binary output byte Z$i$ are transmitted from the F2 and F1 output terminals, respectively, of 4-bit arithmetic logic unit 20. The least significant bits Z2-Z6 of binary output byte Z$i$ are transmitted from the F16-F1 output terminals, respectively, of 5-bit arithmetic logic unit 10. The parity prediction bit ZP associated with binary output byte Z$i$ is transmitted from the FP output of unit 20. The carry-out signal COUT from unit 10 is received as the duplicate carry-in signal CIND input of logic unit 20.

Figure 3:
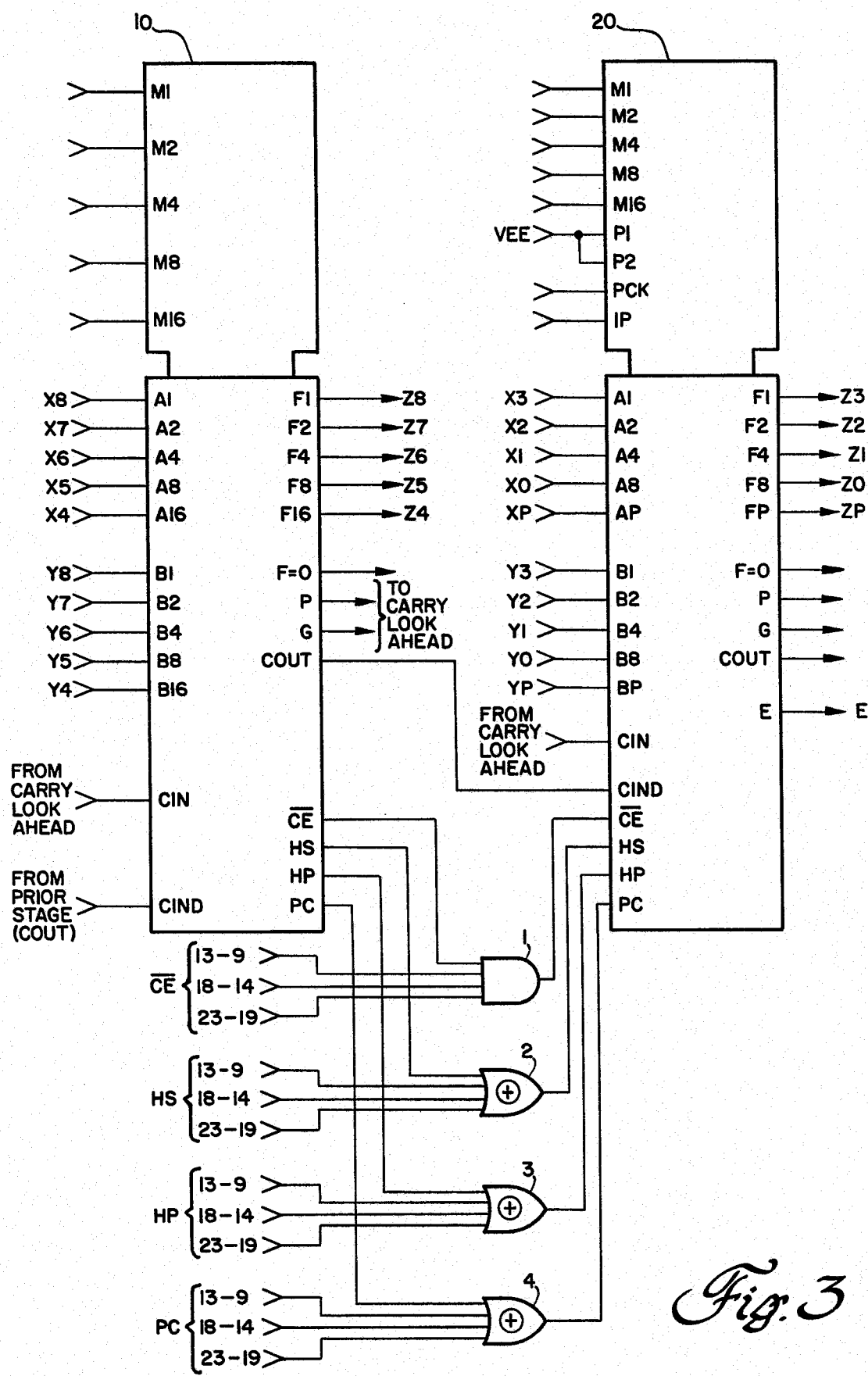
FIG. 3 shows a block diagram illustrating yet another embodiment of the current mode arithmetic logic circuit with parity prediction and checking of the present invention.

Referring now to FIG. 3, a block diagram is shown illustrating another embodiment of the current mode arithmetic logic circuit with parity prediction and checking of the present invention. The configuration shown in FIG. 3 is designed to handle parity prediction and parity checking in the case where it is desired to generate and check a single parity bit for a byte of size $n$, where $n > 9$. As is seen from FIG. 3, additional logic circuitry in the form of AND gate 1 and exclusive-OR gates 2-4 is required in order to perform the desired parity prediction and parity checking operations when $n$ exceeds nine. The specific example illustrated in FIG. 3 is for the case where $n = 24$.

The highest order bits X0-X3 of one of the input bytes X$i$ are received at input terminals A8-A1, respectively, of unit 20. The next highest order input bits X4-X8 are received at input terminals A16-A1, respectively, of unit 10. The next group of less significant bits X9-X13 is received at the A16-A1 input terminals, respectively, of an additional 5-bit arithmetic logic unit 10 (not shown). The remaining 5-bit groupings of inputs X14-X18 and X19-X23 are received at corresponding input terminals A16-A1, respectively, of yet two additional 5-bit arithmetic logic units (not shown in FIG. 3) of identical construction to that of unit 10. The Y$i$ input bits are received in similar fashion to the X$i$ bits. The XP parity bit and the YP parity bit are received at input terminals AP and BP, respectively, of logic unit 20.

The 4-bit arithmetic logic unit 20 generates the most significant bits of binary output Z$i$ in the form of bits Z0-Z3 from its output terminals F8-F1, respectively. 5-bit arithmetic logic unit 10 generates from its output terminals F16-F1 the binary output bits Z4-Z8, respectively, and the remaining 5-bit arithmetic logic units (not shown) generate the successively less significant groups of 5-bit outputs from their corresponding F16-F1 output terminals. Logic unit 20 generates the desired parity prediction bit ZP from its output terminal FP and an error signal E, if any, from output terminal E.

Since there are plural $\overline{CE}$, HS, HP, and PC signals generated by 5-bit arithmetic logic unit 10 and its three counterparts, additional circuitry in the form of AND gate 1 and exclusive-OR gates 2-4 is used to combine the plural signals into one $\overline{CE}$ signal, one HS signal, one HP signal, and one PC signal. AND gate 1 receives all of the $\overline{CE}$ signals and generates an output to the $\overline{CE}$ input terminal of logic unit 20 only if all $\overline{CE}$ signals are a logic 1. Exclusive-OR gate 2 is responsive to an HS signal from any of the 5-bit arithmetic logic units and generates an output to the HS input terminal of the logic unit 20. Exclusive-OR gates 3 and 4, likewise, are responsive to HP and PC signals, respectively, from any of the 5-bit units, and they generate signal inputs to the HP and PC terminals, respectively, of logic unit 20.

It will be apparent to those skilled in the art that the disclosed current mode arithmetic logic circuit with parity prediction and checking may be modified in numerous ways and may assume many embodiments other than that specifically set out and described above.

Accordingly, it is intended by the appended claims to cover all modifications of the invention which fall within the true spirit and scope of the invention.

What is claimed is:

1. A current mode arithmetic logic circuit for performing a repertoire of arithmetic and logic operations on two $n$-bit plus parity bytes A$i$ and B$i$, where $n \geq 5$, and for generating a parity prediction signal FP representing the expected state of the parity bit associated with the resultant binary output F$i$, and for further generating an error signal E in the event that parity or carry errors occur during said operations, said arithmetic logic circuit comprising:

a 5-bit arithmetic logic unit for receiving the five lowest order bits of each of said $n$-bit plus parity bytes, a carry-in input CIN, a duplicate carry-in input CIND, and a mode control signal, said 5-bit arithmetic logic unit generating the five lowest order bits of the binary output resultant of the operation defined by said mode control signal, said 5-bit arithmetic logic unit further generating a propogate signal P, a generate signal G, a carry-out signal COUT, and a group of special output signals comprising a parity of the half-sums signal HS, a parity of the half-parity signal HP, a parity of the carry signal PC, and a carry error signal $\overline{CE}$; and a 4-bit arithmetic logic unit receiving the $n$-5 highest order bits of each of said $n$-bit plus parity bytes, said 4-bit arithmetic logic unit further receiving said group of special outputs from said 5-bit arithmetic logic unit, said 4-bit arithmetic logic unit generating the $n$-5 highest order bits of the binary output resultant of the operation defined by said mode control signal, said 4-bit arithmetic logic unit further generating said parity prediction signal FP and said error signal E in the event that an error occurs during the generation of said carry-out signal COUT or said parity prediction signal FP.

2. The current mode arithmetic logic circuit as recited in claim 1, where $n > 9$, and further comprising one or more additional 5-bit arithmetic logic units, as necessary to accommodate those bits in each byte in excess of 9, each of said 5-bit arithmetic logic units generating a CE signal, an HS signal, an HP signal, and a PC signal, an AND gate receiving as inputs thereto all of the HS signals, a second exclusive OR gate receiving as inputs thereto all of the HP signals, and a third exclusive-OR gate receiving as inputs thereto all of the PC signals, said 4-bit arithmetic logic unit receiving the outputs of said AND gate and said first, second, and third exclusive-OR gates in place of said special output signals, and said 4-bit arithmetic logic unit generating the four highest order bits of the resultant output signal $Z_i$.

* * * * *